(12) United States Patent
Mänz

(10) Patent No.: US 12,674,480 B2
(45) Date of Patent: Jul. 7, 2026

(54) CONNECTION SYSTEM AND METHOD FOR CONNECTING COMPONENTS WITH TOLERANCE COMPENSATION

(71) Applicant: Airbus Operations GmbH, Hamburg (DE)

(72) Inventor: Christian Mänz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 381 days.

(21) Appl. No.: 18/311,320

(22) Filed: May 3, 2023

(65) Prior Publication Data
US 2023/0358261 A1      Nov. 9, 2023

(30) Foreign Application Priority Data

May 6, 2022    (EP) .................................... 22171956

(51) Int. Cl.
  *F16B 7/04*          (2006.01)
(52) U.S. Cl.
  CPC .................................. *F16B 7/0413* (2013.01)
(58) Field of Classification Search
  CPC ............. B64C 1/069; Y10T 403/32032; Y10T 403/32771; Y10T 403/32737; F16C 11/0633; F16C 11/0638; F16C 11/0661; F16C 11/106
  See application file for complete search history.

(56) References Cited

U.S. PATENT DOCUMENTS

| | | | | | |
|---|---|---|---|---|---|
| 685,983 | A | * | 11/1901 | Gutmann | ................ A41F 11/02 |
| | | | | | 24/44 |
| 892,105 | A | * | 6/1908 | White | ..................... F16L 3/202 |
| | | | | | 248/62 |
| 1,317,903 | A | * | 10/1919 | Whimster | ............... B60R 13/00 |
| | | | | | 403/90 |
| 2,401,413 | A | * | 6/1946 | Colwell | ............... A47G 25/485 |
| | | | | | D6/326 |
| 2,441,188 | A | | 5/1948 | Earhart | |
| 2,533,494 | A | * | 12/1950 | Mitchell, Jr. | ...... F16M 11/2078 |
| | | | | | 335/229 |

(Continued)

FOREIGN PATENT DOCUMENTS

WO      WO-2020058636 A1 *  3/2020  .......... F16C 11/0604

OTHER PUBLICATIONS

European Search Report for European Patent Application No. 22171956 dated Nov. 8, 2022; priority document.

*Primary Examiner* — Amber R Anderson
(74) *Attorney, Agent, or Firm* — Greer, Burns & Crain, Ltd.

(57)          ABSTRACT
A connection system includes at least a first part and at least a second part, both comprising a connection surface and being configured to be connected to each other. A plurality of engagement elements is protruding from the connection surface of the first part and from the connection surface of the second part. For connecting different components, the parts are positioned such that their connection surfaces are facing each other. A ductile material is positioned between the connection surfaces of the parts to be connected to each other. The parts are pressed together, wherein the engagement elements are pressed into the ductile material at required positions, thereby compensating position deviations.

14 Claims, 8 Drawing Sheets

(56)  References Cited

U.S. PATENT DOCUMENTS

| | | | | |
|---|---|---|---|---|
| 3,433,510 | A | * | 3/1969 | Hulterstrum ........ F16C 11/0619 |
| | | | | 403/77 |
| 3,687,131 | A | * | 8/1972 | Rayport ................. A61B 10/02 |
| | | | | 600/562 |
| 3,691,788 | A | * | 9/1972 | Mazziotti ................ F16C 11/10 |
| | | | | 16/334 |
| 3,780,402 | A | * | 12/1973 | Takabayashi ........... D06F 55/00 |
| | | | | 24/507 |
| 3,841,769 | A | * | 10/1974 | Bowerman ........... F16C 11/106 |
| | | | | 248/478 |
| 3,914,828 | A | * | 10/1975 | Noda ........................ A41F 3/02 |
| | | | | 24/507 |
| 4,005,510 | A | * | 2/1977 | Noda ...................... A41F 11/06 |
| | | | | 24/507 |
| 4,084,299 | A | * | 4/1978 | Noda ........................ A41F 3/02 |
| | | | | 24/507 |
| 4,222,680 | A | * | 9/1980 | Browning .......... E04H 12/2238 |
| | | | | 403/56 |
| 4,449,768 | A | * | 5/1984 | Koncelik ............... H01R 4/646 |
| | | | | 439/98 |
| 4,620,813 | A | * | 11/1986 | Lacher ................. F16C 11/106 |
| | | | | 403/93 |
| 5,177,813 | A | * | 1/1993 | Bosack ................... A41F 17/00 |
| | | | | 2/325 |
| 5,588,767 | A | * | 12/1996 | Merlo ................... F16M 11/14 |
| | | | | 403/103 |
| 5,897,417 | A | * | 4/1999 | Grey ..................... F16M 11/14 |
| | | | | 403/90 |
| 5,916,269 | A | * | 6/1999 | Serbousek ............ A61F 2/3859 |
| | | | | 623/22.24 |
| 5,954,354 | A | * | 9/1999 | Chung ..................... B62J 15/02 |
| | | | | 280/852 |
| 6,109,815 | A | * | 8/2000 | Merlo ................... F16M 11/14 |
| | | | | 403/103 |
| 6,217,249 | B1 | * | 4/2001 | Merlo .................... A61F 2/604 |
| | | | | 403/321 |
| 6,238,124 | B1 | * | 5/2001 | Merlo ...................... A61F 2/68 |
| | | | | 403/103 |
| 6,494,635 | B1 | * | 12/2002 | Merlo ................... F16M 11/14 |
| | | | | 403/103 |
| 6,561,476 | B2 | * | 5/2003 | Carnevali ............. F16M 11/14 |
| | | | | 248/181.1 |
| 6,581,892 | B2 | * | 6/2003 | Carnevali ............. F16M 11/14 |
| | | | | 403/90 |
| 6,660,040 | B2 | * | 12/2003 | Chan ..................... A61F 2/3877 |
| | | | | 623/22.17 |
| 6,702,502 | B1 | * | 3/2004 | Graber ................ F16C 11/0638 |
| | | | | 403/124 |
| 7,025,315 | B2 | * | 4/2006 | Carnevali ......... F16M 11/2078 |
| | | | | 403/56 |
| 7,090,181 | B2 | * | 8/2006 | Biba .................. F16M 11/2078 |
| | | | | 403/56 |
| 7,588,384 | B2 | * | 9/2009 | Yokohara ........... F16C 11/0638 |
| | | | | 184/5 |
| 8,246,266 | B2 | * | 8/2012 | Lang ....................... B60R 1/072 |
| | | | | 403/127 |
| 8,453,300 | B1 | * | 6/2013 | Michnik .................. B25G 3/32 |
| | | | | 16/425 |
| 8,601,615 | B2 | * | 12/2013 | Isaacson ................. A41F 17/00 |
| | | | | 2/400 |
| 8,960,629 | B2 | * | 2/2015 | Rizk ...................... F16M 11/14 |
| | | | | 248/481 |
| 10,458,463 | B2 | * | 10/2019 | Benthien ............. F16C 11/0661 |
| 10,890,209 | B2 | * | 1/2021 | Arginteanu ........... F16M 13/00 |
| 11,781,588 | B2 | * | 10/2023 | Leborgne ............... F16C 11/10 |
| | | | | 403/90 |
| 12,228,170 | B1 | * | 2/2025 | Joshi ................... F16C 11/0614 |
| 12,416,781 | B2 | * | 9/2025 | Lang ....................... F16C 11/10 |
| 2002/0198535 | A1 | * | 12/2002 | Watson, Jr. .......... A61B 17/122 |
| | | | | 606/120 |
| 2004/0172043 | A1 | * | 9/2004 | Watson, Jr. ........... A61B 90/92 |
| | | | | 606/120 |
| 2004/0215211 | A1 | * | 10/2004 | Watson, Jr. .......... A61B 17/122 |
| | | | | 606/120 |
| 2011/0058893 | A1 | * | 3/2011 | Merlo ..................... F16C 11/10 |
| | | | | 403/104 |
| 2013/0326848 | A1 | * | 12/2013 | Strahl ................... B60P 7/0823 |
| | | | | 24/69 ST |
| 2017/0058959 | A1 | | 3/2017 | Benthien et al. |
| 2018/0216754 | A1 | | 8/2018 | Ciasulli et al. |
| 2022/0250523 | A1 | * | 8/2022 | Jenab .................... B60N 3/026 |

* cited by examiner

CONNECTION SYSTEM AND METHOD FOR CONNECTING COMPONENTS WITH TOLERANCE COMPENSATION

CROSS-REFERENCES TO RELATED APPLICATIONS

This application claims the benefit of the European patent application No. 22171956.0 filed on May 6, 2022, the entire disclosures of which are incorporated herein by way of reference.

FIELD OF THE INVENTION

The invention relates to a connection system with tolerance compensation for connecting components, and to a method of connecting components by using a connection system.

The invention is in particular applicable for connecting components of an aircraft structure. But it may also be applied for connecting other types of components.

BACKGROUND OF THE INVENTION

During aircraft assembly, a large number of components or modules are assembled. Usually, tolerances have to be compensated in order to reach the specified positions. The tolerance compensation can generally be achieved in two ways: First, by drilling for riveting during the assembly. However, this creates chips and thus leads to a contamination which is not allowed in the final assembly of an aircraft. Second, additional components like, e.g., spherical bearings, tooth plates, adjuster screw connections, etc., have to be used. However, each component or part can compensate deviations in only one or two directions. Because up to three deviations may occur, in each case three translational and rotational deviations, a large number of such parts are necessary. Therefore, the effort of costs and weight is very high.

SUMMARY OF THE INVENTION

It is an object of the invention to provide a connection system which is able to connect a component or an assembly in a flexible, lightweight and stable way to already existing components or parts, like, e.g., a frame in a fuselage of an aircraft. Therefore, deviations of the intended positions shall be compensated in all possible directions.

According to a first aspect, the invention provides a connection system with tolerance compensation for connecting components, in particular of an aircraft structure, comprising at least a first part and at least a second part, both comprising a connection surface configured to be connected to each other;

a plurality of engagement elements protruding from the connection surface of the first part and from the connection surface of the second part, a ductile material configured for being positioned between the connection surfaces of the first part and of the second part, such that the engagement elements are pressed into the ductile material at required positions when the parts are pressed together, thereby compensating deviations in the intended position of the components to be connected.

Preferably, the connection system is configured for transmitting a load from at least one of the first and second parts into the ductile material and from there to the at least other one of the first and second parts.

Preferably, the first and second parts are configured to compensate position deviations of the components to be connected in 5 or 6 degrees of freedom.

Preferably, at least one of the connection surfaces is curved and/or convex to allow a rotation between the parts while they are being connected.

Preferably, the first part comprises at least two shell segments, and at least one of the second parts is configured as a sphere element to be included in between the shell segments, wherein the position and/or orientation of the at least one sphere element is adjustable relative to the shell segments while connecting the first and second parts, and/or when the first and second parts are finally connected to each other.

Preferably, a bearing element is arranged between one of the first and second parts and the ductile material to provide a swivel mounted connection.

Preferably, the first and second parts are configured such that at least two of the first parts include one or more second parts in between them when mutually connecting the parts.

Preferably, the first and second parts are configured such that at least two of the second parts include one or more one first parts in between them when mutually connecting the parts.

Preferably, the first or second part comprises first fixation elements configured to engage with second fixation elements of a similar or identical part when both parts are put together to enclose another part.

Preferably, the parts are configured such that, before the parts are pressed together, the second part can be rotated relative to the first part around one or more axes of rotation, or vice versa, to adjust its position.

Preferably, the parts are configured such that before the parts are pressed together, the second part can be moved relative to the first part in a lengthwise direction, or vice versa, to adjust its position.

Preferably, the first part or the second part comprises a pair of arms arranged opposite to each other for fixing the other part in between them.

Preferably, the pair of arms is arranged at more than one first part or second part to surround the other part from different sides.

Preferably, the pair of arms is arranged at both ends of the first part or of the second part.

Preferably, the connection surfaces provided on the inner sides of the pair of arms and/or of the connection surface to be connected thereto are curved to allow a rotation between the parts while they are being connected and before they are pressed together.

Preferably, the pairs of arms are configured to be arranged perpendicular and/or with an adjustable angle with respect to each other.

Preferably, the engagement elements are arranged in a plurality of rows, which may be parallel.

Preferably, the engagement elements are formed as claws.

In particular, the engagement elements may be formed as dents or house roofs.

Preferably, the engagement elements may comprise a lengthwise extending top edge. Preferably, the engagement elements may be formed as segments of cylinders; and/or as sickles.

According to a second aspect of the invention, a method of connecting components is provided, comprising the steps:

providing a connection system comprising at least a first part and at least a second part, both comprising a connection surface and being configured to be connected to each other, wherein a plurality of engagement elements is protruding from the connection surfaces of the first part and from the connection surface of at least one of the second parts;

positioning the parts such that their connection surfaces are facing each other;

arranging a ductile material between the connection surfaces of the parts to be connected to each other; and pressing the parts together, wherein the engagement elements are pressed into the ductile material at required positions, thereby compensating position deviations.

Preferably, the connection element according to the first aspect of the invention is used in the method.

Characteristics and advantages described in relation to the connection system are also related to the method of connecting components, and vice versa.

BRIEF DESCRIPTION OF THE DRAWINGS

In the following, exemplary embodiments of the invention showing further advantages and characteristics are described in detail with reference to the figures, in which.

In the figures, similar or identical elements and features are designated by the same reference numbers. The features, functions and advantages discussed herein and shown in the embodiments can be achieved independently and combined in other embodiments.

DETAILED DESCRIPTION OF THE PREFERRED EMBODIMENTS

Figure 1:
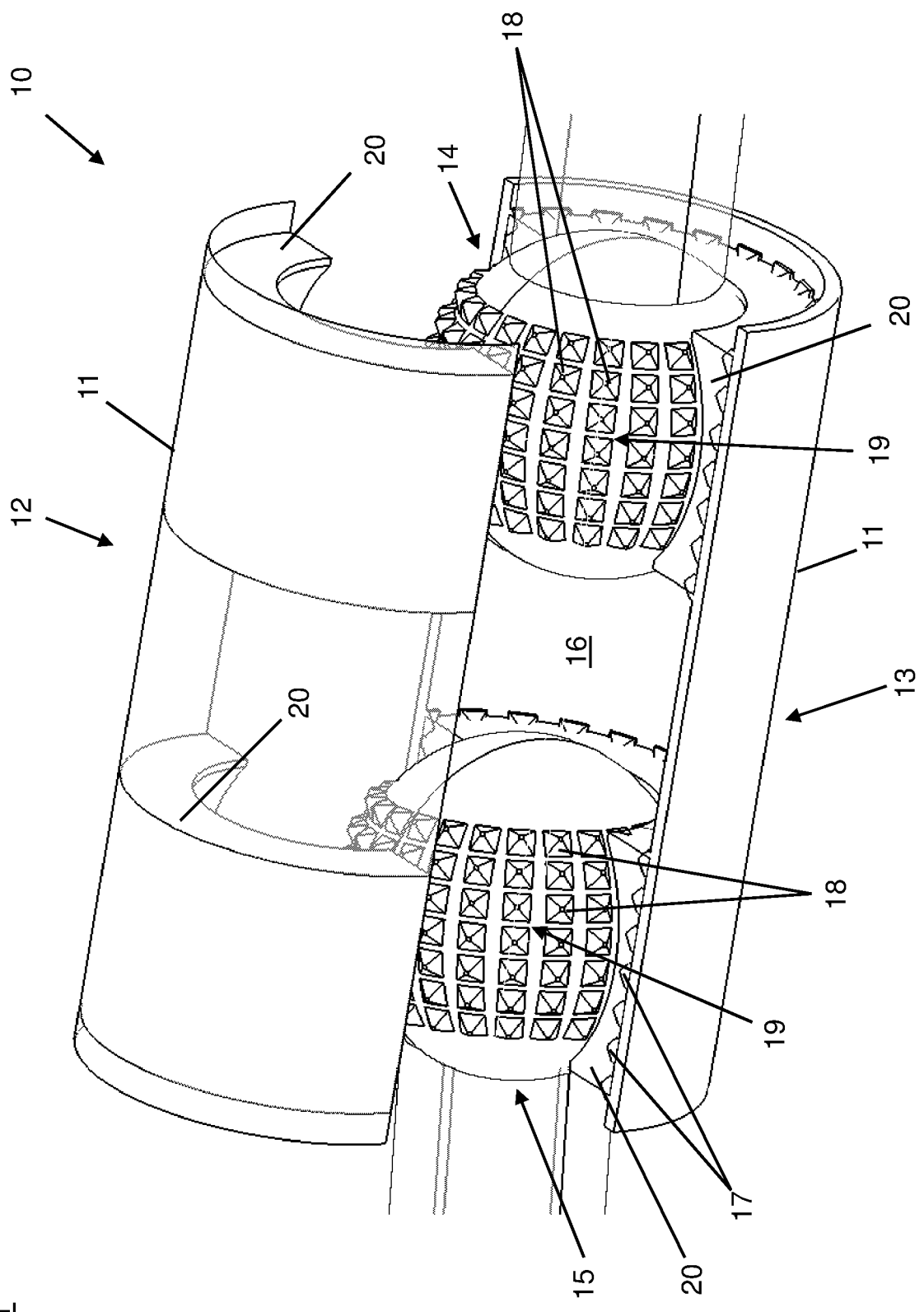
FIG. 1 shows a schematic perspective view of a connection system according to a preferred embodiment of the invention.

FIG. 1 depicts a connection system 10 according to a first preferred embodiment of the invention. The connection system 10 comprises a first part 11 which is formed by two shell segments 12, 13, each forming a half shell of a cylinder. Two second parts 14, 15 formed as sphere elements or balls are provided for being connected to the first part 11 at the inner sides of the shell segments 12, 13 when the shell segments 12, 13 are put together. The shell segments or half shells 12, 13 comprise at their inner sides, which are each configured as a connection surface 16, a plurality of engagement elements 17 formed as claws protruding from the connection surface 16. The second parts or sphere elements 14, 15 comprise, in a similar way, a plurality of similar engagement elements 18 formed as claws 18 protruding from the outer surface or connection surface 19 of each sphere element 14, 15.

A ductile material 20 is positioned between the connection surface 19 of each sphere element 14, 15 and the connection surfaces 16 of the first part 11 at the inner side of shell segments 12, 13. The engagement elements or claws 17 of the first part 11 and the engagement elements or claws 18 of the second parts or sphere element is 14, 15 are formed to engage with each other when the parts are mutually connected, i.e., when the shell segments 12, 13 are connected to each other thereby enclosing the sphere elements 14, 15 and connecting to them.

The ductile material 20 is configured and positioned such that the engagement elements 17, 18 are pressed into the ductile material 20 when the first and second parts 11, 14, 15 are pressed together for being connected. Thus, deviations in the target position or intended position of the second parts 14, 15 relative to each other are compensated by the ductile material 20 between the plurality of similarly or correspondingly shaped engagement elements 17 and 18.

For connecting the second parts 14, 15 to each other, which may be in a position deviating from their intended position or target position, the half shells 12, 13 are attached to the second parts such that their connection surfaces 16 are facing the connection surfaces 19 of the second parts or sphere elements 14, 15. The ductile material 20 is provided between the connection surfaces 16, 19 before they are attached to each other, and thus between the engagement elements or claws 17 and 18 opposing each other.

The position, i.e., the location and orientation of the sphere elements or second parts 14, 15 relative to each other, may vary due to deviations with respect to the positions of the components to be connected, which are comprising one of the parts 14, 15 or being connected thereto. These deviations are compensated by the ductile material 20, since the claws 17, 18 are pressed into the ductile material 20 and engage with each other at the required positions when both half shells are pressed against each other to form a cylinder with the sphere elements 14, 15 in the interior of the cylinder.

Thus, attachment points with fixed positions can be exactly met, for example when different components of the structure like, e.g., an aircraft structure are connected, for example frames, stringers, etc.

Figure 2:
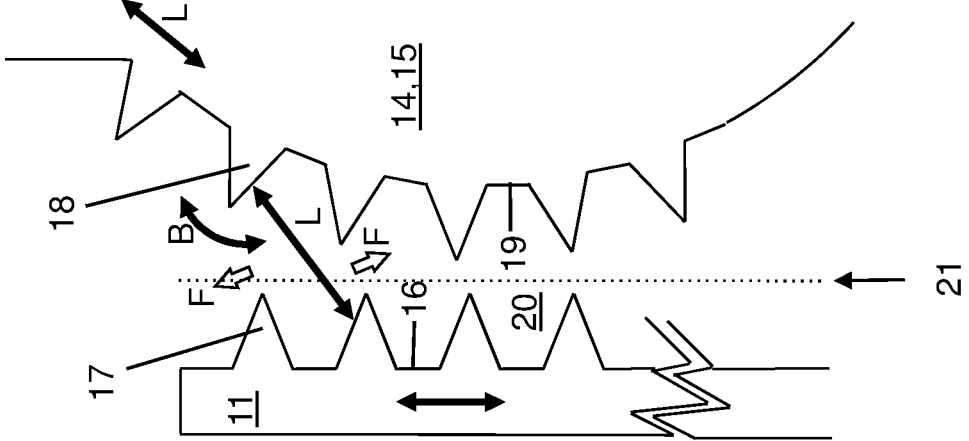
FIG. 2 shows an enlarged section of the connection system shown in FIG. 1, where a first part contacts a second part.

FIG. 2 shows an enlarged sectional view of a portion of the first part 11 and of the second part 14 or 15 when they are being connected. The arrows L show the load transmission between the parts via the ductile material 20, and arrow B indicates a possible bending in the claws 17, 18 when the first part 11 is pressed against the second part 14, 15. Arrows F indicate a possible flow of the ductile material 20 if its strength is exceeded. Thus, connection system 10 transmits the load from one of the parts into the ductile material 20 and from there to the other part to which it is connected.

A clearance 21 is provided between the opposite claws 17 and 18 in order to adjust the position and orientation of the first part 11 or half shells 12, 13 to the actual position, including location and orientation of second parts or sphere elements 14, 15 before the half shells 12, 13 are pressed against each other and thus against the sphere elements or balls 14, 15.

The engagement elements 17, 18 may, in particular, be formed like house roofs. Preferably the engagement elements have a relatively broad basis at the connection surface 16, 19 from which they protrude, and a relatively sharp edge for pressing them into the ductile material 20 at the required positions. Preferably, the engagement elements or claws 17, 18 are arranged in rows (see FIG. 1). They may also have other shapes providing a strong basis, and a front which is sharp enough for being pressed into the ductile material. In particular, they may also be formed as pyramids.

The ductile material 20 is preferably made of polyamide. Alternatively, metals or alloys may be used as the ductile material 20, like, e.g., tin metal or tin alloy, or bearing metals, or other materials which deform under strain resulting from pressing the half shells 12, 13 forming first part 11 against the second parts 14, 15 and thus pressing the claws 17, 18 into the ductile material 20.

Figures 3, 4:
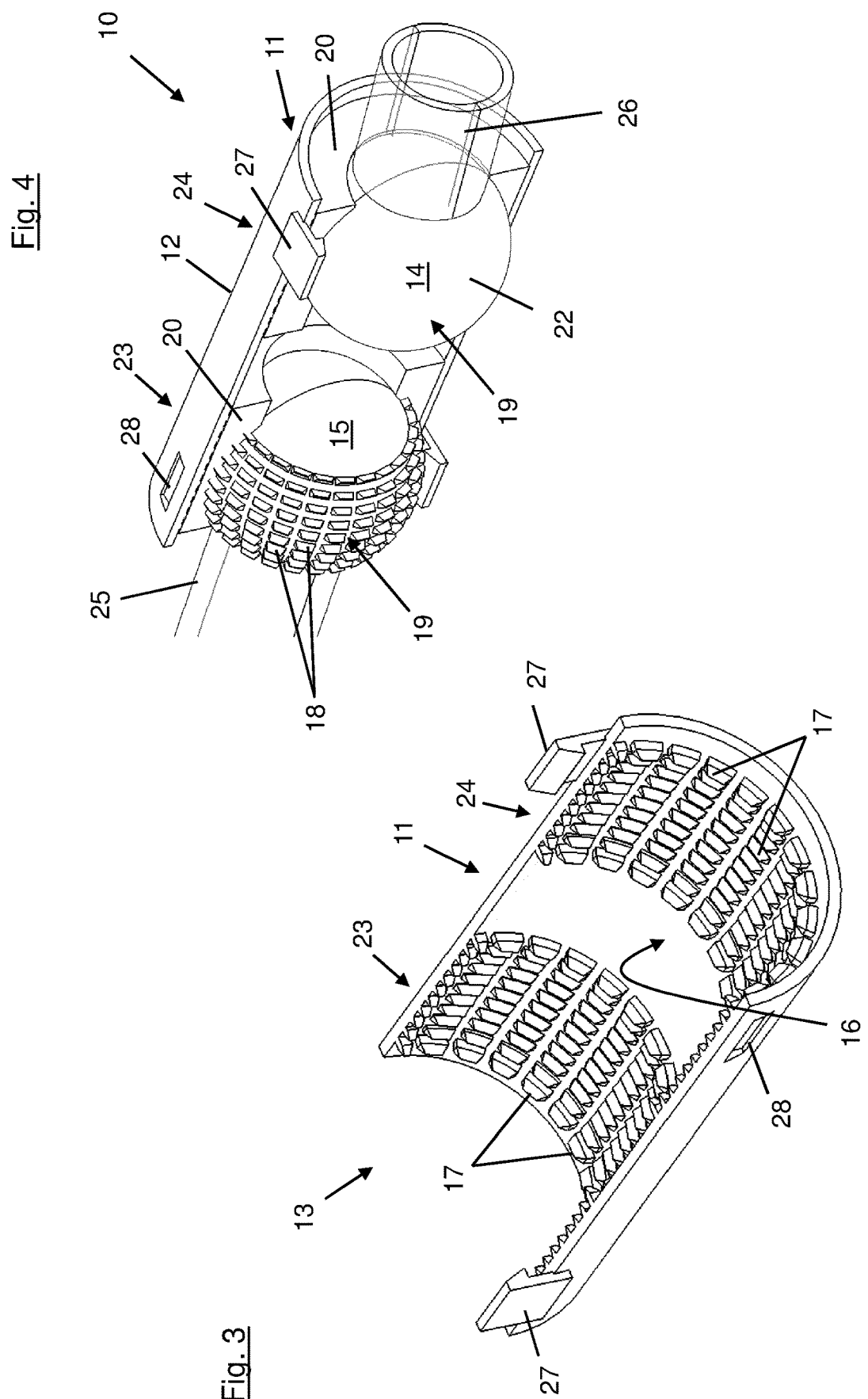
FIG. 3 shows a schematic perspective view of a half shell of the connection system of FIG. 1.
FIG. 4 shows a schematic perspective view of a half shell and two sphere elements of the connection system of FIG. 1, wherein one of the parts is configured according to a specific option.

Referring to FIGS. 3 and 4 now, further details of connection system 10 are described. FIG. 4 shows an option in which one of the sphere elements, here sphere element 14, is not provided with claws.

The connection surfaces 16 of first part 11 formed by half shells 12, 13 is curved and has a concave shape, whereas the connection surfaces 19 of the second parts or sphere element 14, 15 have a convex shape. The curvature of half shells 12, 13 and sphere elements 14, 15 are adapted to each other to allow a rotation of the sphere elements 14, 15 when being positioned in the half shells 12, 13.

Thus, when mutually connecting the parts 11, 14, 15, both second parts or sphere elements 14, 15 are included between both first parts or shell segments 12, 13. The positions including location and orientation of the sphere elements 14, 15 may deviate from their intended or target positions. However, the half shells 12, 13 are configured by their specific shapes for being attached to such deviating positions.

Figure 6:
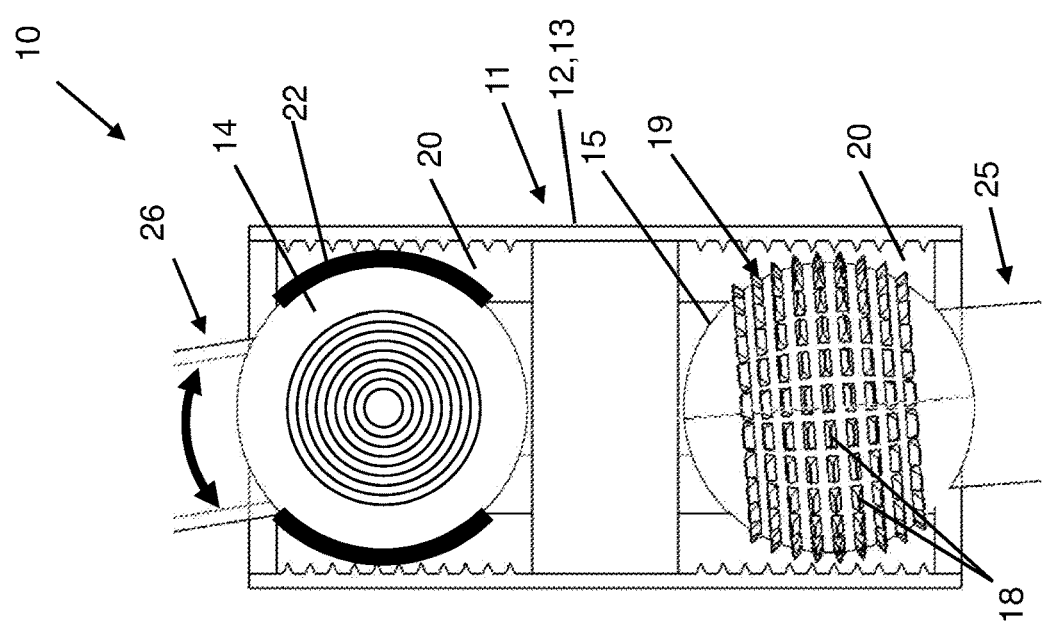
FIG. 6 shows a schematic top view of the half shell shown in FIG. 4.

FIGS. 4 and 6 depict an option, wherein the sphere element 14 is covered by a bearing metal 22 instead of comprising claws. The bearing metal 22 is positioned between the basic structure of sphere element 14 and the ductile material 20. As a result, sphere element 14 remains pivotable in two directions perpendicular to each other after the first and second parts 11 and 14, 15 were connected. The other second part or sphere element 15 however will be fixed in the required orientation due to its claws 19 being pressed into the ductile material 20 between sphere element 15 and half shells 12,13, when the half shells are pressed against each other and thus against the sphere elements 14, 15 in the interior of second part 11.

According to another option which is not shown here, sphere element 14 is configured like sphere element 15, i.e., it comprises claws or engagement elements 18 protruding from its connection surface 19.

Figure 5:
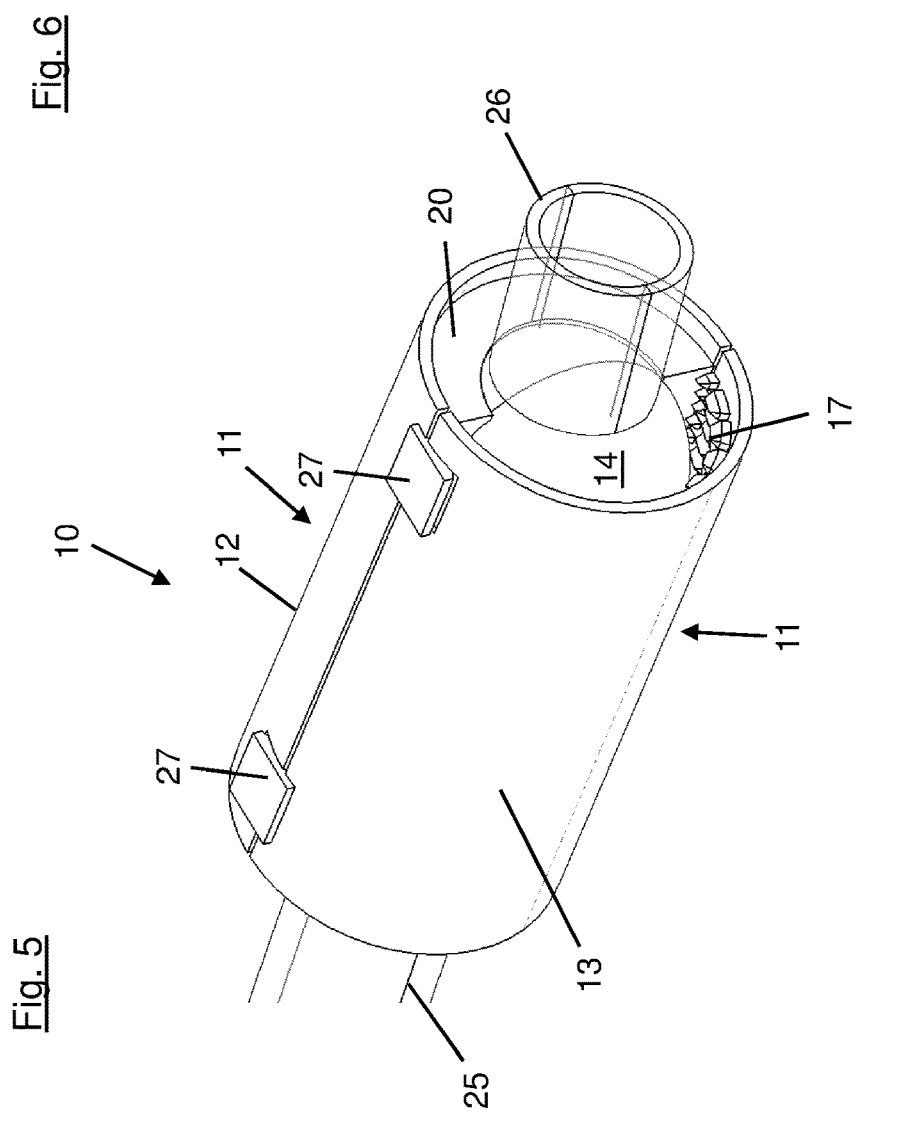
FIG. 5 shows a schematic perspective view of the connection system of FIG. 1 when its parts are connected.

As depicted in FIGS. 3 to 5, each half shell 12, 13 of first part 11 comprises two sections 23, 24 to accommodate the sphere elements 14, 15, wherein the two sections 23, 24 are spaced apart from each other. The claws 17 are provided in each section 23, 24. This allows different distances between both sphere elements 14, 15 when they are positioned in the shell segments 12, 13. Since both sphere element 14, 15 can be pivoted during assembly, each with two degrees of freedom, and the position of the sphere elements 14, 15 relative to the shell segments 12, 13 can vary before the parts are pressed together, the connection system 20 is fully adaptable to the position and orientation of the components 25, 26 to be connected. Components 25, 26 are attached to or comprised by sphere elements 14, 15.

Half shells 12, 13 of first part 11 comprise fixation elements 27 which are configured as locking or clamping elements to engage with corresponding fixation elements 28 of the identical opposite first part 11 when the shell segments 12 and 13 are pressed together to enclose the sphere elements 14, 15 in between them. In particular, the fixation elements 27 are configured as flexible projections formed as hooks which engage with holes or recesses 28 of the other shell segment when both shell segments 12, 13 are pressed against each other.

It is noted that the connection system 10 can be realized in various configurations. In particular, the number, form and material of the shell segments 12, 13 may vary according to specific requirements. Further, the number, form and material of the second part or parts positioned in the first part or parts may vary. Further it can be selected whether one or more second parts shall be provided with a bearing metal or not, depending on whether or not a swivel connection is required on one or on both sides of the connection system 10.

Now, with reference to the FIGS. 3 to 5, an example of a method of connecting components is described.

A connection system like, e.g., the connection system 10 as explained above is provided. Two parts 14, 15, which are formed by, or which comprise sphere elements or balls, are part of or are fixedly attached to two components 25, 26 which shall be connected via the sphere elements 14, 15 at a specific position. That position, however, may deviate from an intended position or target position due to tolerances in the positions of the components 25, 26.

Then, first shell segment 12 formed as a half shell is added, as well as ductile material 20 which shall be positioned between the sphere elements 14, 15 and shell segment 12. During this step, the position and orientation of half shell 12 meets the positions of both sphere elements 14, 15 such that it can be attached thereto. Ductile material 20 formed by a plastic material like in particular polyamide or nylon, or formed by a ductile metal or alloy like, e.g., tin or another bearing metal, is arranged between connection surface 16 of half shell 12 and the connection surfaces 19 of both sphere elements 14, 15.

Second half shell 13 is added. Ductile material 20 is provided, e.g., as a layer or as a plurality of separate layers or stripes, between both half shells 12, 13 and sphere elements 14, 15. Second half shell 13 is connected to first half shell 12, such that both half shells 12, 13 form a cylinder or sleeve enclosing the sphere elements 14, 15 in between.

First and second half shells 12, 13 are pressed against each other such that claws 17 of both half shells 12, 13 and opposite claws 18 of sphere elements 14 and/or 15 are pressed into the ductile material 20 positioned between the inner sides of half shells 12, 13 and the outer sides of sphere elements 14, 15. Pressing both half shells 12, 13 against each other may be enforced, e.g., by a crimping tool at least partly surrounding the half shells.

Locking elements or hooks 27 of both half shells 12, 13 are snapped into place, i.e., they engage with recesses or slots 28 formed in both half shells in the specific embodiment shown here.

As an alternative or in addition to locking hooks and recesses, other fixation means like, e.g., screws can be used to fix both half shells 12, 13 to each other.

A described above, sphere element or a ball 14 shown in FIGS. 4 and 6 comprises on its outer surface the bearing element 22 instead of claws 19, which is an option. However, the method described herein is similar.

Figure 7:
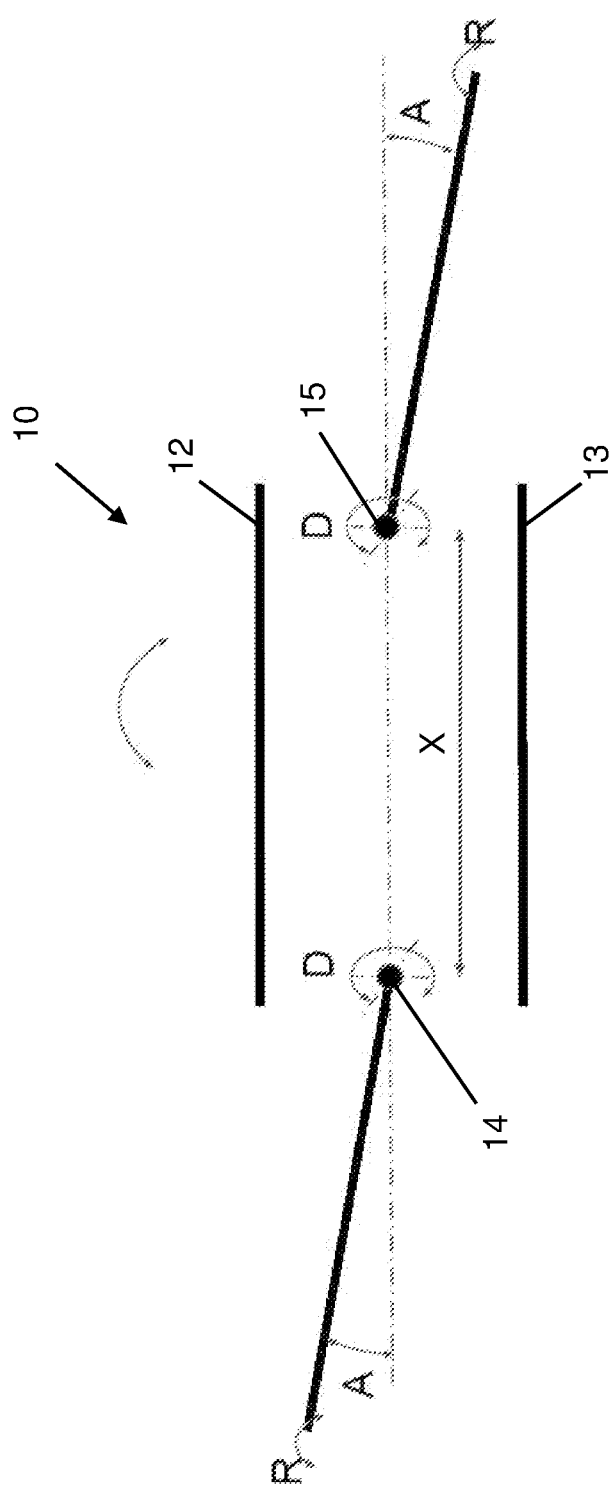
FIG. 7 shows a schematic diagram in which the degrees of freedom provided by the connection system of FIGS. 1 to 6 are depicted.

FIG. 7 depicts the degrees of freedom of sphere elements 14, 15 when they are positioned between half shells 12, 13. Reference signs A and D indicate the amount and direction of pivoting, and R indicates the rotation of the respective sphere element 14, 15 when it is being positioned between half shells 12 and 13. X indicates the variable distance between both sphere elements 14, 15. Thus 6 degrees of freedom are provided for connecting the components attached to or comprising the sphere elements 14, 15.

Figures 8, 9:
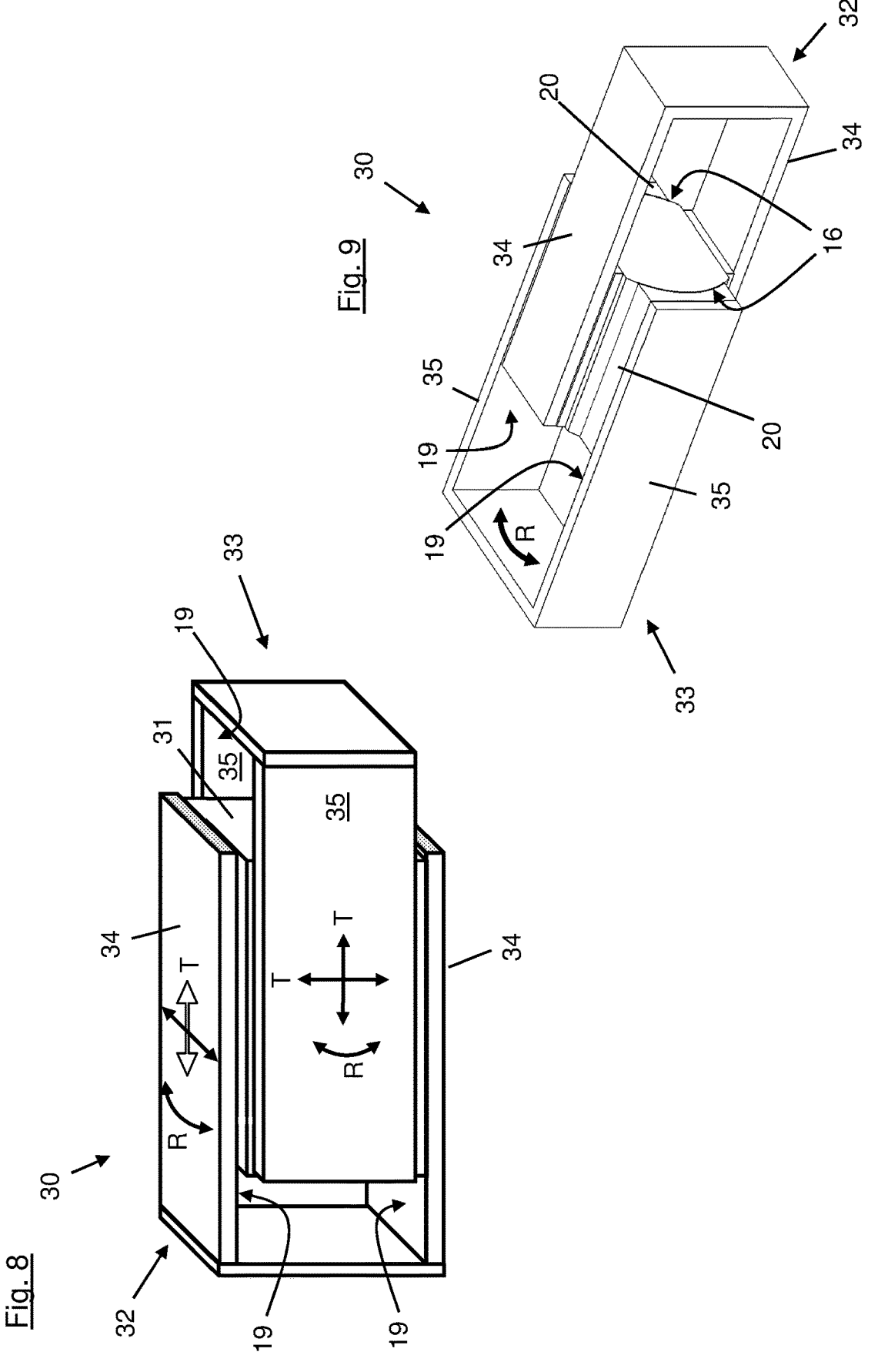
FIG. 8 shows a schematic perspective view of a connection system according to a second preferred embodiment of the invention.
FIG. 9 shows a schematic perspective view of the connection system of FIG. 8 in a specific optional configuration.

FIG. 8 depicts a second preferred embodiment of the invention. Here, connection system 30 comprises first part 31 formed as a block and two second parts 32, 33, each formed as a fork comprising a pair of arms 34, 35 respectively.

First part 31 is positioned between the first pair of arms 34 and the second pair of arms 35, which are oriented perpendicular to each other. Thus, both second parts 32, 33 are positioned such that the connection surfaces 16 of first part 31 (not visible in the figure) on all four sides of first part 31 are placed opposite to connection surfaces 19 at the inner sides of each arm pair 34, 35.

All connection surfaces 16, 19 are provided with a plurality of engagement elements (not visible in FIGS. 8 and 9), which may be configured as claws similar to those discussed above with reference to the first preferred embodiment.

The engagement elements shown in this embodiment and also in the other embodiments described above and further below, may also be formed as sickles for example, and may they may all be configured similar to those described above Ductile material 20 is positioned between the connection surfaces 19 at the inner sides of the arm pairs 34, 35 of second parts 32, 33 and the connection surfaces at the four outer sides 16 of first part 31.

Preferably, as depicted in FIG. 9, the connection surfaces 16 on two opposite outer sides of first part 31 have a convex shape which allows a rotation are of first part 31 connected to arm pair 34 of second part 32 relative to the other second part 33 which is oriented perpendicular to part 32. Corresponding thereto, the ductile material layers 20 placed between the arms 35 of second part 33 and the convex surfaces 16 of first part 31 have a convex shape.

Both second parts 32, 33 are oriented with an angle of 90° relative to each other, which can be varied due to the convex opposite surfaces 16 of first part 31 and the concave inner connection surfaces 19 of both layers of ductile material 20 that are opposite to them.

The positions of both second part 32, 33 relative to each other can be varied in two directions D which are perpendicular to each other, as indicated in FIG. 8. That means, that the distance between both second part 32, 33 may be varied in a lengthwise direction, and in addition thereto, both second parts 32, 33 may rotate relative to each other. Finally, the second parts 32, 33 may rotate in the third rotational direction R (shown in FIG. 9), which will be achieved by the curvature of the connection surfaces 16. Further, the position of second part 32 relative to the other second part 33 can be varied in a transverse direction when the connection surfaces 19 of both arms 34 of second part 32 and the corresponding opposite connection surfaces of first part 31 are flat.

For further details of connection system 30, reference is made to the description above with respect to the first embodiment of the invention.

By connection system 30, two components which are connected to the second part 32 and the other second part 33 respectively can be connected to each other according to the specific position and orientation.

Figure 10:
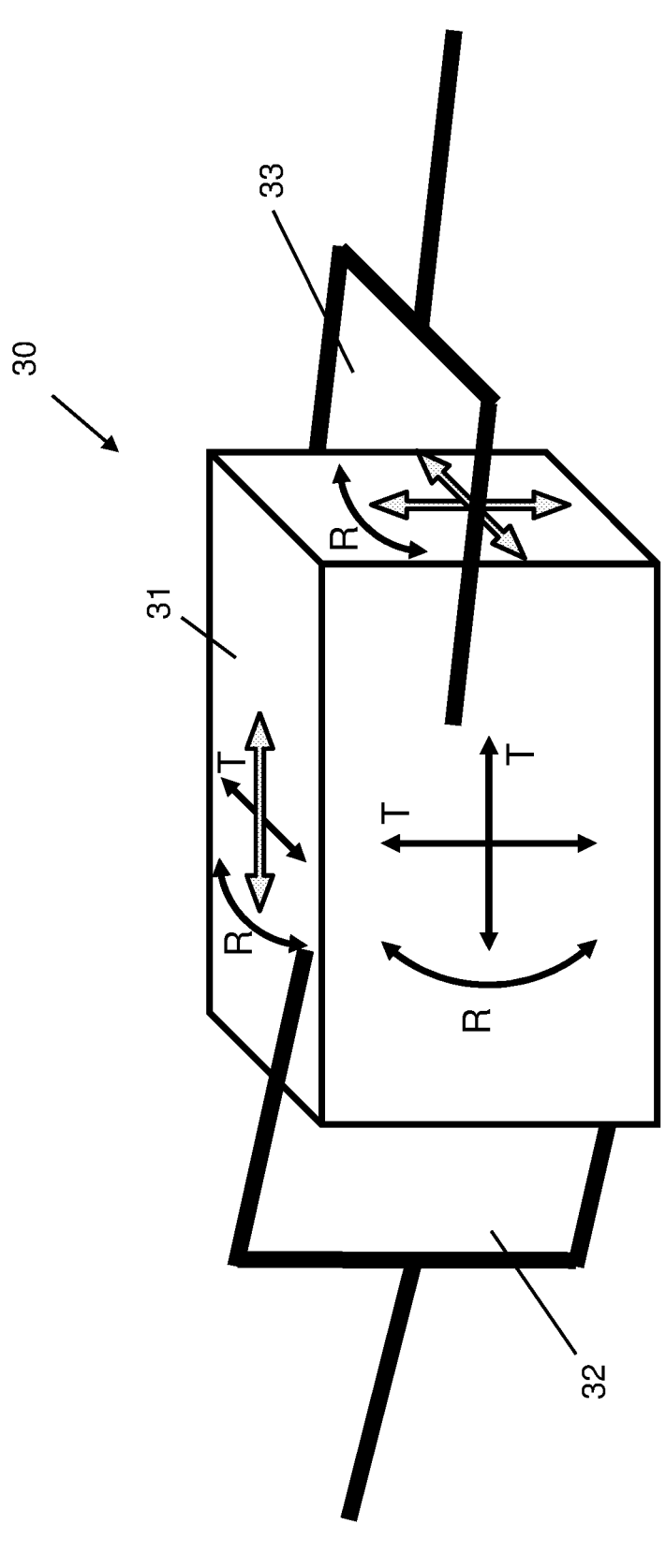
FIG. 10 shows a schematic diagram in which the degrees of freedom provided by the invention are depicted, using FIGS. 8 and 9 as an example.

FIG. 10 depicts the degrees of freedom of second parts 32, 33 when they are positioned at first part 31 for being connected. Reference signs R indicate the rotation of the respective second part 32, 33 when it is positioned. Reference signs T indicate possible translational movements between both second parts 32, 33 when they will be connected. Thus 6 degrees of freedom are provided for connecting the second parts 32, 33 and components attached thereto.

Figure 11:
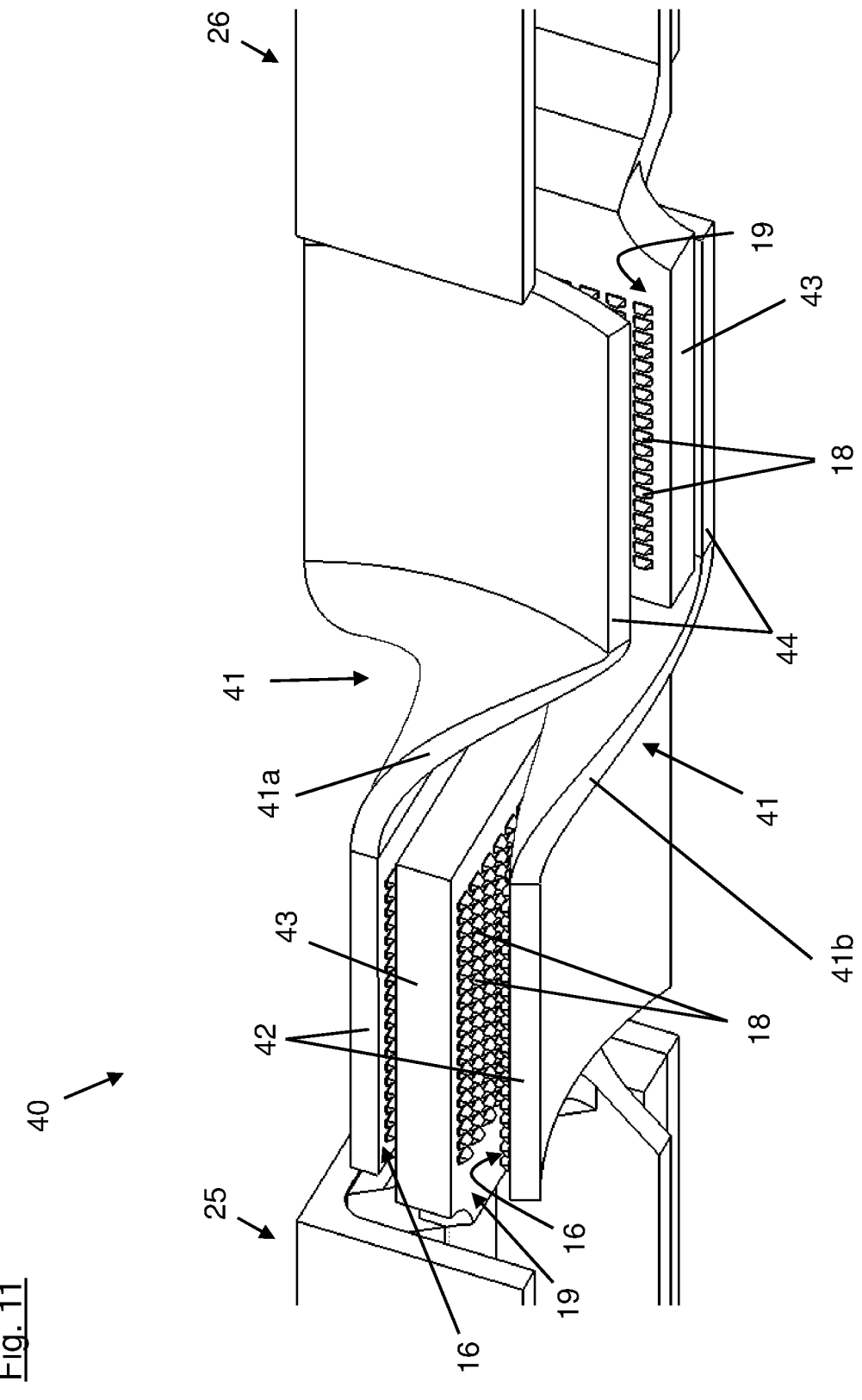
FIG. 11 shows a schematic perspective view of a connection system according to a third preferred embodiment of the invention.

FIG. 11 shows a further connection system 40 according to a third preferred embodiment of the invention. The connection principle is similar to that described above with respect to the other embodiments. However, the connection system 40 comprises a first part 41 comprising two identical twisted elements 41a, 41b, arranged parallel to each other and forming a pair of arms 42, 44 at both ends of the first part 41. The first part 41 is thus configured to receive at each ends a second part 43 between the parallel arm pairs 42, 44.

The connection surfaces 16 on the opposing sides of arm pairs 42, 44 and the connection surfaces 19 on the outer sides of each second part 43 are provided with engagement elements 17, 18 formed as claws which are pressed in a ductile material between the connection surfaces 16, 19 of parts 41, 43 and engage with each other when both parts 41, 43 are being connected.

Thus, two components 25, 26, each connected to or comprising one second part 43 at its end, can be connected to each other by first part 41 centrally arranged between the two second parts 43 and partly overlapping them. Thus, the first part 41 forms a connection element for connecting two second parts 43.

The connection surfaces 16 at the inner sides of arm pairs 42 and 44 at both ends of first part 41 are curved and have a convex shape, while the connection surfaces 19 of second parts 43 to be positioned between the arms of arm pairs 42, 44 are flat, thus allowing a rotation of the first part 41 along a rotation axis extending in the lengthwise direction of the first part 41, which is the connecting direction, when it is positioned between two second parts 43 for connecting them. Thus, the twisted parallel elements 41a, 41b of first part 41 may roll like the rocking of a cradle on the flat connection surfaces 19 of second parts 43. Further, the second pair of arms 44 provided at one end of first part 41 may preferably be twisted by 90° relative to the first pair of arms 42 provided at its other end, as shown in this specific embodiment.

As described above with respect to the other embodiments of the invention, ductile material 20 is formed, e.g., by or comprising polyamide material, nylon or another plastic material, or a ductile metal or alloy like tinplate and similar, will be positioned between the connection surfaces 16, 19 of the first parts 41 and of the second part 43.

When both first parts 41 are being connected to the opposite ends of second part 43, their positions relative to each other can deviate in two directions, i.e. the distance between both first parts 41 may deviate, and additionally their position between the pair of arms 42, 44 may deviate in two directions. Further, the rotational orientation of both arms 41 relative to each other may deviate, due to the convex shape of connection surfaces 19 of second part 43.

For further details of this embodiment, reference is made to the other embodiments described above. Details described in the different embodiments can be combined with each other. A variety of special configurations of the first and second parts and the ductile material between the connection surfaces and the protruding elements is possible.

The method of connecting two components by using, e.g., the connection system 30 or 40 is in principle similar to that described above with reference to connection system 10:

At least a first part 31, 41 and at least a second part 32, 34, 43 are provided, both comprising connection surfaces 16, 19 provided with a plurality of engagement elements or claws 17, 19 protruding there from. The first part or parts 31, 41 and the second part or parts 32, 34, 43 are configured to be connected with their connection surfaces facing each other.

Ductile material 20 is positioned between the connection surfaces 16, 19 of the first part 31, 41 and the second part 32, 34, 43 such that the engagement elements or claws 17, 18 of the parts are pressed into the ductile material at the required positions when the parts are pressed together for being connected, Tolerances or deviations of the positions of two parts when they are being connected to each other are compensated in up to 6 degrees of freedom by the ductile material 20 into which the claws 17, 18 are pressed at the required position.

For further details, reference is made to the description above related to FIGS. 1 to 11.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

10, 30, 40 connection system
11 first part
12, 13 shell segments/half shells
14, 15 second parts/sphere elements
16 connection surfaces
17, 18 engagement elements/claws
19 connection surfaces
20 ductile materials
21 clearance
22 bearing element/bearing metal
23, 24 sections of half shells
25, 26 components to be connected
27 locking elements/hooks
28 locking elements/recesses or slots
31 first part
32, 33 second parts
34, 35 pairs of arms
41 first part
41*a,b* twisted parallel elements
42, 44 pair of arms
43 second part
A amount of pivoting
D direction of pivoting
T translational movement R rotation
X distance between sphere elements

The invention claimed is:

1. A connection system with tolerance compensation for connecting components, comprising:
   at least one first part and at least one second part, both first and second parts comprising a connection surface and being configured to be connected to each other;
   a plurality of engagement elements protruding from the connection surface of the first part and from the connection surface of the second part, and
   a ductile material configured to be positioned between the connection surfaces of the first part and of the second part such that the engagement elements are pressed into the ductile material at required positions when the first and second parts are pressed together for being connected, thereby compensating deviations in an intended position of the components to be connected,
   wherein the first and second parts are configured to compensate position deviations of the components to be connected in 5 or 6 degrees of freedom,
   wherein the 5 or 6 degrees of freedom comprise compensation along a lengthwise axis.

2. The connection system according to claim 1, further configured to transmit a load from at least one of the first and second parts into the ductile material and from there to the at least other one of the first and second parts.

3. The connection system according to claim 1, wherein at least one of the connection surfaces is at least one of curved or convex to allow a rotation between the first and second parts while the first and second parts are being connected.

4. The connection system according to claim 1,
   wherein the first part comprises at least two shell segments, and at least one of the second parts is configured as a sphere element to be included in between the shell segments,
   wherein at least one of the position or orientation of the sphere element is adjustable relative to the shell segments, at least one of:
      while the first and second parts are being connected, or
      when the first and second parts are finally connected to each other.

5. The connection system according to claim 1, wherein the first and second parts are configured such that
   at least two of the first parts include one or more second parts in between them, or
   at least two of the second parts include one or more first parts in between them,
   when mutually connecting the first and second parts.

6. The connection system according to claim 1, wherein the first or second part comprises first fixation elements configured to engage with second fixation elements of an identical part when both parts are put together to enclose another part.

7. The connection system according to claim 1, wherein the first and second parts are configured such that, before the first and second parts are pressed together, at least one of:
   the at least one second part is rotatable relative to the at least one first part around one or more axes of rotation, or vice versa, to adjust its position; or
   the at least one second part can be moved relative to the at least one first part in a lengthwise direction, or vice versa, to adjust its position.

8. The connection system according to claim 1, wherein at least one of the first or second parts comprises a pair of arms arranged, at least one of:

opposite to each other for fixing the other of the first or second part in between the pair of arms;

to surround the other of the first or second part from different sides; or at both ends of that first or second part.

9. The connection system according to claim 1, wherein the engagement elements are arranged in a plurality of rows.

10. The connection system according to claim 1, wherein the engagement elements are formed as claws, dents, house roofs, cylinder segments, sickles, or a combination thereof.

11. The connection system according to claim 1, wherein the components comprise components of an aircraft structure.

12. A method of connecting components, comprising the steps:

providing a connection system comprising at least one first part and at least one second part, both comprising a connection surface and being configured to be connected to each other, wherein a plurality of engagement elements is protruding from the connection surface of the first part and from the connection surface of at least one of the second parts;

positioning the first and second parts such that their connection surfaces are facing each other;

arranging a ductile material between the connection surfaces of the first and second parts to be connected to each other;

pressing the first and second parts together, wherein the engagement elements are pressed into the ductile material at required positions, thereby compensating position deviations, wherein the first and second parts are configured to compensate position deviations of the components to be connected in 5 or 6 degrees of freedom, wherein the 5 or 6 degrees of freedom comprise compensation along a lengthwise axis.

13. The method according to claim 12, wherein the components comprise components of an aircraft structure.

14. A method of connecting components, comprising the steps:

providing a connection system comprising at least one first part and at least one second part, both first and second parts comprising a connection surface and being configured to be connected to each other, wherein a plurality of engagement elements is protruding from the connection surface of the first part and from the connection surface of at least one of the second parts, at least one of the at least one first part or at least one of the at least one second part being part of or being fixedly attached each of the components to be connected;

positioning the first and second parts such that their connection surfaces are facing each other;

providing a ductile material configured to be positioned between the connection surfaces of the first part and of the second part, arranging the ductile material between the connection surfaces of the first and second parts;

pressing the first and second parts together to connect the first and second parts to each other, wherein the engagement elements are pressed into the ductile material at required positions, thereby compensating position deviations in an intended position of the components to be connected, wherein the first and second parts are configured to compensate position deviations of the components to be connected in 5 or 6 degrees of freedom, wherein the 5 or 6 degrees of freedom comprise compensation along a lengthwise axis.

* * * * *